(12) United States Patent
Yamamoto

(10) Patent No.: US 6,787,178 B2
(45) Date of Patent: Sep. 7, 2004

(54) HEALTH DRINK AND METHOD FOR PRODUCTION THEREOF

(76) Inventor: Kiyoshi Yamamoto, 326-2, Aza Midoridai 1-chome, Uchinada-machi, Kahoku-gun, Ishikawa (JP), 920-0276

( * ) Notice: Subject to any disclaimer, the term of this patent is extended or adjusted under 35 U.S.C. 154(b) by 221 days.

(21) Appl. No.: 10/191,777

(22) Filed: Jul. 9, 2002

(65) Prior Publication Data
US 2003/0031778 A1 Feb. 13, 2003

(30) Foreign Application Priority Data

Jul. 9, 2001 (JP) .................................... 2001-208202

(51) Int. Cl.$^7$ .............................. A23L 1/211; A23L 2/72
(52) U.S. Cl. .................... 426/634; 426/331; 426/330.1; 426/519; 426/580
(58) Field of Search ................................. 426/634, 580, 426/330.1, 331, 519

(56) References Cited

FOREIGN PATENT DOCUMENTS

| JP | 08173050 | 7/1996 |
| JP | 10004907 | 1/1998 |
| JP | 2001120180 | 5/2001 |

*Primary Examiner*—Helen Pratt
(74) *Attorney, Agent, or Firm*—McCarter & English, LLP

(57) ABSTRACT

A health drink is disclosed which is composed of (A) 3–15% by mass of soymilk calculated as a solid content, (B) 0.2–8% by mass of egg white calculated as a solid content, (C) 0.1–5% by mass of a sweetener calculated as a solid content, and (D) the balance of water (providing that A+B+C+D total 100% by mass).

8 Claims, 3 Drawing Sheets

HEALTH DRINK AND METHOD FOR PRODUCTION THEREOF

BACKGROUND OF THE INVENTION

1. Field of the Invention

This invention relates to a drinking water which possesses nearly the same flavor as milk, emits the odor inherent in soymilk or soybeans only sparingly, and excels in conduciveness to health and a method for the production thereof.

2. Description of the Related Art

The soymilk which is obtained by immersing soybeans in water and compressing the impregnated soybeans has soybean protein as a main component thereof. Thus, it has been drawing special attention as a food rich in both nutritional value and nutrient and beneficial to health. It has been pointed out nevertheless that the soymilk readily releases such coarse tastes as is associated with astringency and diffuses bad flavor as compared with milk and that it possesses smells such as smell of grass, smell of fish, and smell of withered grass which are peculiar to soymilk (smells of soybeans) and the flavor which is inherent in soybeans (odor of soybeans). Various researches and developments have been continued in search of a method for repressing the smell of soybeans and the odor of soybeans with a view to rendering the soymilk easy to drink. A method for giving the soymilk a heat treatment adapted to inactivate the lipoxygenase present therein, a physicochemical treatment, a microorganic treatment (JP-A-2001-120180), a method for adding an sweetener or a spice, and a flavor improving agent (JP-A-08-173050), for example, have been reported to date. The methods and the treatments mentioned above, however, have not been appreciably disseminated popularly because they take time, necessitate special facilities, and occasionally fail to repress the smell of soybeans sufficiently.

Conditioned soymilk products which are obtained by immersing soybeans in water, compressing the impregnated soybeans thereby forming soymilk, and adding rice oil, sugar, solar dried salt, calcium lactate, emulsifying agent, paste (carageenan), and spice to the soymilk have been also marketed. Since they are widely different in taste from milk and are not fully satisfactory in terms of flavor, it is hardly fair to admit that they have been disseminated popularly.

An object of this invention, therefore, is to provide a health drink which is made easier to drink by repressing the soybean smell peculiar to soymilk and the soybean odor inherent in soybeans and a method for the production thereof.

Another object of this invention is to provide a health drink which is made easier to drink by causing the taste of soybean to approximate closely to the taste of milk and meantime preserving the conduciveness of soymilk to health and a method for the production thereof.

Yet another object of this invention is to provide a health drink which is capable of lowering the blood sugar and a method for the production thereof.

Still another object of this invention is to provide a health drink which enjoys good balance between the plant protein and the animal protein.

SUMMARY OF THE INVENTION

I, after pursuing a diligent study with a view to accomplishing the objects mentioned above, have acquired a knowledge that by performing a simple procedure of mixing soymilk with egg white, it is made possible to repress so significantly the smell of soybeans peculiar to soymilk and the odor of soybeans inherent in soybeans and the coarse taste associated with astringency as to enable even a person who is allergic to the smell of grass and the astringency and hesitant in drinking soymilk to avoid experiencing displeasure in drinking the soymilk. He has further discovered that by this procedure, it is made possible to obtain a health drink which is capable of lowering the blood sugar. This invention has been perfected on the basis of this knowledge.

Specifically, the objects enumerated above are accomplished by a health drink which is composed of A. 3–15% by mass of soymilk calculated as a solid content, B. 0.2–8% by mass of egg white calculated as a solid content, C. 0.1–5% by mass of a sweetener calculated as a solid content, and D. the balance of water (providing that A+B+C+D total 100% by mass).

The objects described above are also accomplished by a method for the production of a health drink composed of (A) 3–15% by mass of soymilk calculated as a solid content, (B) 0.2–8% by mass of egg white calculated as a solid content, (C) 0.1–5% by mass of a sweetener calculated as a solid content, and (D) the balance of water (providing that A+B+C+D total 100% by mass), which method is characterized by stirring till mixture (A) 3–15% by mass of soymilk calculated as a solid content, (B) 0.2–8% by mass of egg white calculated as a solid content, and (C) 0.1–5% by mass of a sweetener calculated as a solid content and thereafter filtering the resultant mixture thereby removing the excess of egg white which has escaped solution.

This invention concerns a health drink which comprises liquid soymilk and egg white. The health drink of this invention is easy to drink as compared with the conventional soymilk because it does not appreciably emit the smell peculiar to soymilk and the odor inherent in soybeans and has the taste approximating closely to the taste of milk.

Further, since the health drink of this invention contains no milk component, it can be used advantageously as a baby food for infants suffering from allergy to milk. Since it is a highly proteinaceous substance, it is expected to serve as liquid food effective for patients who have undergone a surgical operation.

The health drink of this invention can also be expected to find acceptance as a diet drink because the soymilk and the egg white which are essential components thereof both have low calorific values (low fat) and can easily impart a feeling of fullness to users.

The health drink of this invention is suitable for the cure of diabetes because it is effective in lowering the blood sugar level. Further, the health drink to be obtained by this invention can be used as other foodstuffs such as, for example, the substitute for coffee or milk or the raw material for ice cream and soup.

PREFERRED EMBODIMENT OF THE INVENTION

Figure 1:
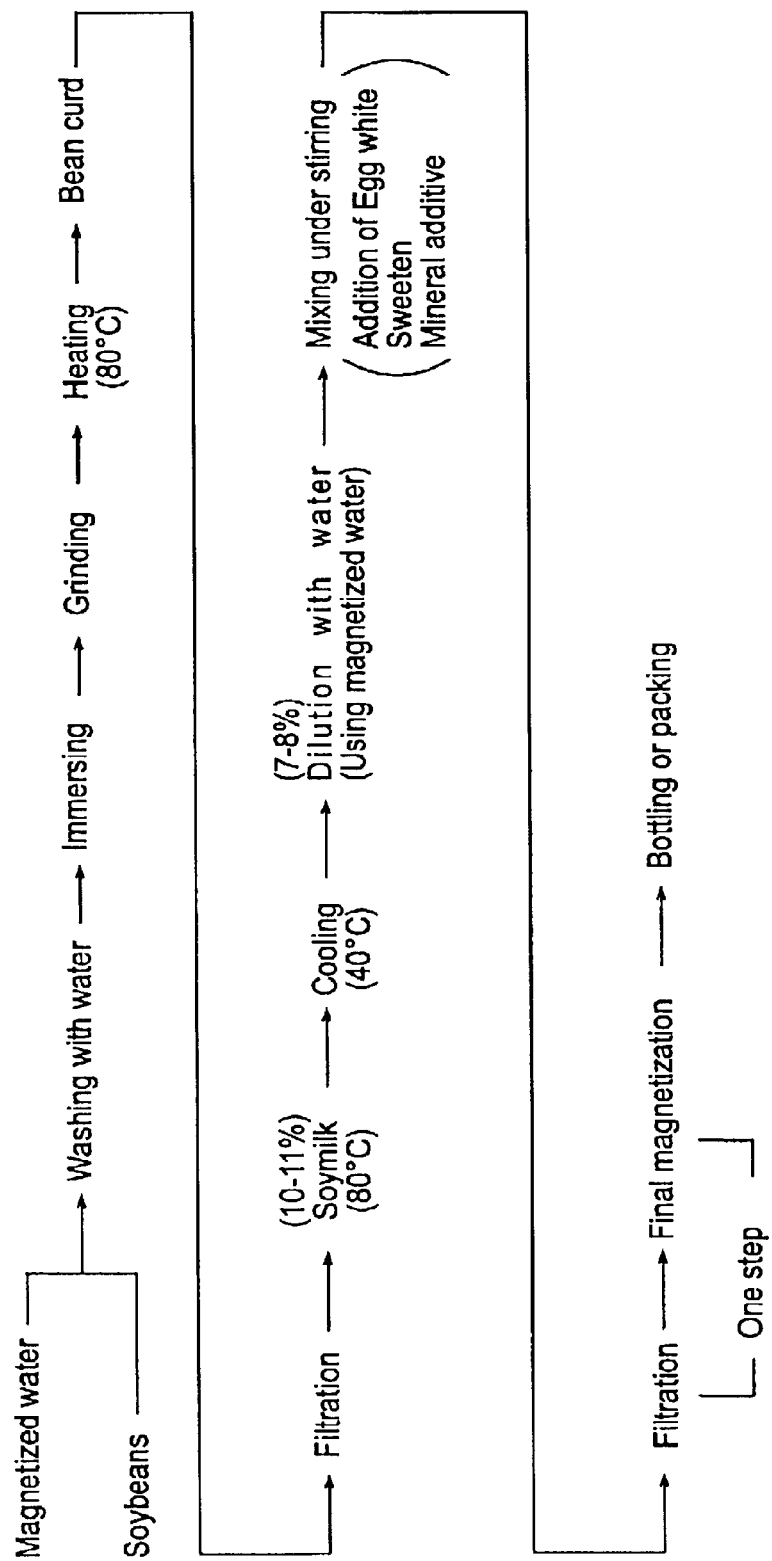
FIG. 1 is a flow chart of a making process of the health drink of this invention.

This invention is directed toward providing a health drink which is composed of liquid soymilk and egg white. By so mixing soymilk with egg white as in this health drink, it is made possible to repress significantly such coarse tastes as the smell of soybeans and the odor of soybeans and the astringency, exalt the sweetness, and enhance the flavor to the extent of converting the soymilk into a beverage easy to drink. Further, the health drink of this invention is suitable for persons who suffer from diarrhea and allergy caused by milk because it retains nearly the same flavor as milk and contains absolutely no component originating in milk. The soymilk (soybeans) contains such active components as plant proteins, vitamin E which is thought to have bearing on the retention of a membrane structure in the cells, the promotion of peripheral circulation, the repression of the formation of lipid peroxide due to the nonspecific antioxidant action, and the prevention of aging, saponin which produces such actions as expectoration, antitussis, extinction of inflammation, antipyresis, sedation, stomachic, drainage, diuresis, sthenia, and invigoration, lecithin which forms an important component of such vital membranes as mitochondrial sheath and plasma membrane and fulfills an important role as in the active transportation of substance and the oxygen reaction, and isoflavone which is expected to be effective in curing prostatic cancinoma and breast carcinoma and the egg white contains such active components as albumins (ovalbumin and conalbumin).

Thus, these active components can be efficiently ingested by simply using the health drink of this invention. Since the health drink of this invention, besides the advantage mentioned above, enjoys the merit that the soymilk and the egg white which are essential components both have low calorific values (low fat), it is also beneficial to persons who are trying the dietary law. The health drink of this invention is also suitable for the cure of diabetes because it brings the effect of lowering the blood sugar level.

In this invention, the soy milk may be obtained by obtained by a known method used for producing soybean curd as by grinding soybeans in water, especially magnetized water and separating soymilk from the resultant suspension. Alternatively, commercially available soymilks, conditioned soymilks, soymilk drinks (with unconditioned components), or soybean protein drinks may be used in the unmodified form. Otherwise, the soymilk may be produced by finely pulverizing soybeans, classifying the resultant soybean powder thereby selecting a portion of soybean powder having a grain size in the approximate range of 18–25 µm, subsequently stirring the portion of soybean powder together with added water thereby obtaining a suspension of soybean powder, heating this suspension to a temperature of about 80° C., and thereafter cooling the hot suspension, for example at a temperature of about 40° C., and then adding the magnetized water to dilute it.

The egg white may be the ordinary so-called egg white which is said to be obtained by breaking fowl eggs and separating egg whites from yolks. It does not need to be limited to the product of this method but may be in the form of so-called egg white in the broad sense of the word. The egg white to be used in this invention may be an egg white which has been purified, extracted, concentrated, or diluted. Otherwise, it may be in the form of egg white portion obtained by removing part of egg white components such as, for example, sugar and lysozyme. Further, the egg white to be used in this invention embraces the sort of egg white which is made as by an enzymatic treatment to acquire a lower molecular weight than the original protein of egg white, the sort of egg white which has the molecular weight thereof increased by having the original protein thereof bound with the protein other than the protein existing in the egg white or with the protein other than the separately added protein, and the sort of egg white which has been bound with a component other than protein such as fatty acid and consequently converted into a polymer on the sole condition that when the egg white is mixed with soymilk, the emission of the smell of soybeans, the odor of soybeans, and the coarse tastes such as astringency can be repressed. Incidentally, the term "fowl eggs" as used herein does not need to be particularly restricted but may be interpreted as referring to all eggs that are usable for meals. The eggs of fowl, quail, duck, and wild duck may be cited as concrete examples of the fowl eggs under discussion. Among other fowl eggs enumerated above, the eggs of hens which are widely in circulation are used particularly advantageously.

In this invention, the ratio of the addition of egg white to the soymilk is in the range of 0.4–0.7 part by mass, preferably in the range of 0.55–0.65 part by mass, and most preferably about 0.6 part by weight, calculated as the solid content of egg white per part by mass of the soymilk calculated as the solid content. If this ratio exceeds 0.7 part by mass, the excess will be at a disadvantage in rendering the solution of egg white difficult and suffering the egg white to stagnate copiously in the solution. Conversely, if the ratio falls short of 0.4 part by mass, the shortage will be at a disadvantage in preventing the effect due to the addition of egg white from being manifested fully satisfactorily and consequently suffering the soymilk to emit the smell peculiar to soymilk and the odor inherent in soybeans. When the ratio is in the range of 0.4–0.7% by mass, the smell peculiar to soymilk and the odor inherent in the soybeans can be significantly repressed and the flavor is enabled to approximate closely to milk.

Then, the health drink according to this invention is composed of 3–15% by mass, preferably 4–10% by mass, and most preferably 7–8% by mass, of soymilk calculated as a solid content, 0.2–8% by mass, preferably 1–6% by mass, and most preferably 3–5% by mass of egg white calculated as a solid content, and the balance of water.

The ratio of the sweetener is in the range of 0.01–5% by mass, preferably 0.3–3% by mass, and most preferably 0.5–2% by mass calculated as a solid content.

The health drink of this composition is produced as follows, for example. For a start, soymilk is obtained by carefully selecting soybeans and then washing them, grinding them as immersed in water, heating the ground soybeans in water, and filtering the resultant suspension of soybean powder. The health drink is obtained by cooling the soymilk so obtained till room temperature, combining the cooled soymilk with such water as magnified water, stirring till mixture the blend of soymilk with water together with egg white (such as, for example, dried egg white powder) added thereto, and then filtering the produced blend. The health drink is otherwise obtained by dissolving 3–15% by mass of soymilk calculated as a solid content in water and adding thereto 0.2–8% by mass of egg white calculated as a solid content. Specifically, by causing the egg white component in the largest permissible quantity, actually in the maximum quantity, to be dissolved in the egg white powder or the egg white till a saturated state if possible (when the solution is effected by stirring, the stirred blend is filtered through a stainless steel net, for example), it is made possible to produce a drink endowed with an excellent taste inherent in the health soymilk. That is, harmony of the taste based on complexed effect of an amino acid component contained in a vegetable protein originated from the soymilk and an amino acid component contained in an animal protein originated from the egg white generates i.e., the taste increased remarkably by complexed amino acid effect. In this case, the temperature of the blend during the course of the stirring for mixture is adjusted properly in the range of 5–60° C., preferably in the range of 30–50° C. Further, the sweetener is added to the produced blend.

As the water to be used in the health drink in accordance with this invention, magnetized water and natural mineral water are suitable. Particularly by using the magnetized water (magnetically treated water) as the initial water at the step for producing soymilk or by magnetically treating the initial water so used, it is made possible to exalt the biocidal property and the dissolving power of the water. Further, the magnetic treatment (filtration) performed at the final stage of the process is effective in improving the taste of the product. That is, about the magnetified water, a magnet having many magnetic flux number is provided with a water inlet of the top water or the well water, so all of the water used is originally magnetized. Further, as the industrial scale of a magnetically treatment device, there is a device which has a circulation path and precipitation of solid particles portion. Futhermore, a secondary treatment is to treat the water again before bottling or packing.

In this invention, the method for mixing egg white with soymilk does not need to be particularly restricted but is only required to ensure homogeneous mixture of these components. As typical examples of this method of mixing, a method which consists in mixing the components and then gently shaking a vessel holding the formed mixed solution, a method which consists in mixing the components and then stirring the formed mixed solution simply with a spoon or chop stick, and a method which comprises physically mixing the components may be cited. When the highly viscous portion of egg white persists in the mixed solution of egg white and soymilk, the pulpy part may be removed as by filtering the mixed solution through a tea strainer or a bamboo sieve.

Further, for the mixture of egg white with soymilk, the method which comprises admixing dried egg white powder into a soymilk solution has been adopted overwhelmingly. The separation of raw egg white by filtration suffers from very inferior efficiency. In obtaining dry powder from raw egg white, therefore, the raw egg white is reduced in mass to one out of seven parts (by extraction of water).

While the health drink of this invention is essentially required to contain soymilk and egg white, it is allowed to contain other components. The other components thus added in this case do not need to be particularly restricted but are only required to attain the flavor aimed at sufficiently without impairing the effect of repressing the smell of soybeans, the odor of soybeans, and the corse flavor associated with astringency. They may be properly selected to suit the purpose of use and the characteristic properties aimed at. As typical examples of the other components, sucrose, maltose, magnesium-enriched sugar, antiseptic agent, stabilizing agent, emulsifier, paste (such as, for example, carageenan), rice oil, natural and man-made sweeteners (sugar, starch syrup, saccharin, and asparteem), salt (sun dried salt, for example), calcium (calcium lactate, for example), natural calcium (powdered oyster shell, powdered coral, etc.), spice, and flavor enhancers (such as additives for imparting the flavor of cocoa, banana, or strawberry) may be cited. The quantity of such other components to be added may be properly selected so long as their addition impairs the effect of repressing the smell of soybeans, the odor of soybeans, and the coarse flavors. These other components may be used in the same quantities as those known to the art.

The health drink of this invention and the health drink produced from the powder of this invention for use in the health drink can be used favorably as baby food for infants who suffer from allergy to milk because they contain no milk component. Further, the health drink of this invention and the health drink produced from the powder of this invention for use in the health drink can be expected to serve as liquid food for patients who have undergone a surgical treatment because they are highly proteinaceous substances.

Now, this invention will be described more specifically below with reference to working examples.

EXAMPLE 1

Method of Small-Scale Production (Household Procedure)

A health drink was obtained by mixing 71 g of an aqueous about 10% soymilk solution, (magnetized solution), 28 g of raw egg white, and 1 g of additive components (maltose and a calcium additive agent) (in a quantity equivalent to two raw egg whites per 100 ml of soymilk) (or equivalent to one raw egg white as diluted to the proximity of 8% by mass) together.

The health drink was tried in comparison with a commercially available soymilk not incorporating any egg white by a panel of 10 members to determine small of grass, bitterness, and deliciousness. As a result, 7 out of 10 members rated the health drink to be free from the smell of grass, 6 of them rated it to be free from the bitterness, and generally 5 out of 10 members rated the health drink to be more delicious.

EXAMPLE 2

Method for Quantity Production

A soymilk was obtained by mixing 70 kg of finely divided soy bean powder with 880 kg of magnetized water till homogeneous dispersion. A homogeneous solution was obtained by mixing 40 kg of dried egg white powder with the soymilk, heating and stirring them to 40° C., then cooling the formed mixture to room temperature, and filtering the cooled mixture. A health drink was obtained by adding 10 kg of maltose containing a calcium additive agent to the resultant homogeneous solution.

EXAMPLE 3

General Method for Production

As shown in FIG. 1, soybeans were washed with 24000 gauss of magnetized water and were immersed into the magnetized water. An amount of the magnetized water was 20 kg and an amount of soybeans was 5 kg. The soybeans were ground and heated at a temperature of 80° C. to obtain soybean curd. Under maintaining this temperature the soybean curd was filtrated to obtain 25 kg of soymilk having a concentration of 10–11% by mass. The soymilk was cooled to a temperature of 40° C. and diluted to a concentration of 7–8% by mass by using the magnetized water. At this stage the total mass reached 40 kg. Then 1.68 kg of the egg white, 0.42 kg of a sweeter (maltose) and 0.0024 kg of a mineral additive (calcium, etc.) were added to the egg white, subjected to mixing, and then filtered in a 8000 gauss of a magnetizing treating device under magnetizing to obtain the health drink, then the health drink was bottled. The components of the obtained health drink are compared with those of milk and others in Table 1.

TABLE 1

| In 100 g | A Soymilk | B Health drink of this invention | C Milk | D Low-fat milk | E Conditioned soymilk |
|---|---|---|---|---|---|
| Energy | 55 Kcal | 53 Kcal < | 64 Kcal | 45 Kcal | 55 Kcal |
| Protein | 5.0 g | 6.1 g > | 3.1 g | 3.1 g | 3.8 g |
| Fat | 3.0 g | 1.9 g < | 3.6 g | 1.5 g | 2.4 g |
| Carbohydrate | 2.0 g | 2.8 g < | 4.8 g | 4.8 g | 4.6 g |
| Sodium | 3 mg | 53 mg ≈ | 46 mg | 46 mg | 60 mg |
| Calcium | 17 mg | 23 mg < | 103 mg | 103 mg | 31 mg |
| G.I. number | 23 | 24 ≈ | 25 | 25 | 24 |

(A) Unconditioned raw soymilk: Soymilk capable of forming Meiraku soybean curd (produced by Nagoya Seiraku, Tempaku-ku, Nagoya-shi).
(B) Health drink of this invention: By method resorting to reduction of soybean powder.
(C) Milk: Data available from the firm manufacturing Morinaga Ordinary Milk.
(D) Low-fat milk: Morinaga low-fat milk.
(E) Conditioned soymilk: Conditioned soymilk manufactured by Marusanai (Okazaki-shi, Aichi-ken).

As being clear from Table 1, conventional conditioned soymilk E is very similar with nutrition composition of milk C, but the conditioned milk is added a large amount of the sweeteners (5% by mass or more of maltose), so it belongs to a favorite food. On the contrary, a nutrition composition of the health drink in accordance with the present invention contains more protein and lesser carbohydrates compared with the milk and has lower calory, but there is only one disadvantage that is low is calcium content. However, such advantage can be improved by adding natural calcium to some extent. Further, reviewing the composition of protein, as an ingestion instruction for maintaining the health of a human being, the ingestion ratio of the vegetal protein to the animal protein is 2:1, that is, two third of the vegetable protein and one third of the animal protein is appropriate. Weight (mass) ratio of the soymilk protein to the egg white protein is very similar to this ideal value, so the usual ingestion of such health drink gives healthy superiority without any disadvantages.

EXAMPLE 4

Figure 2:
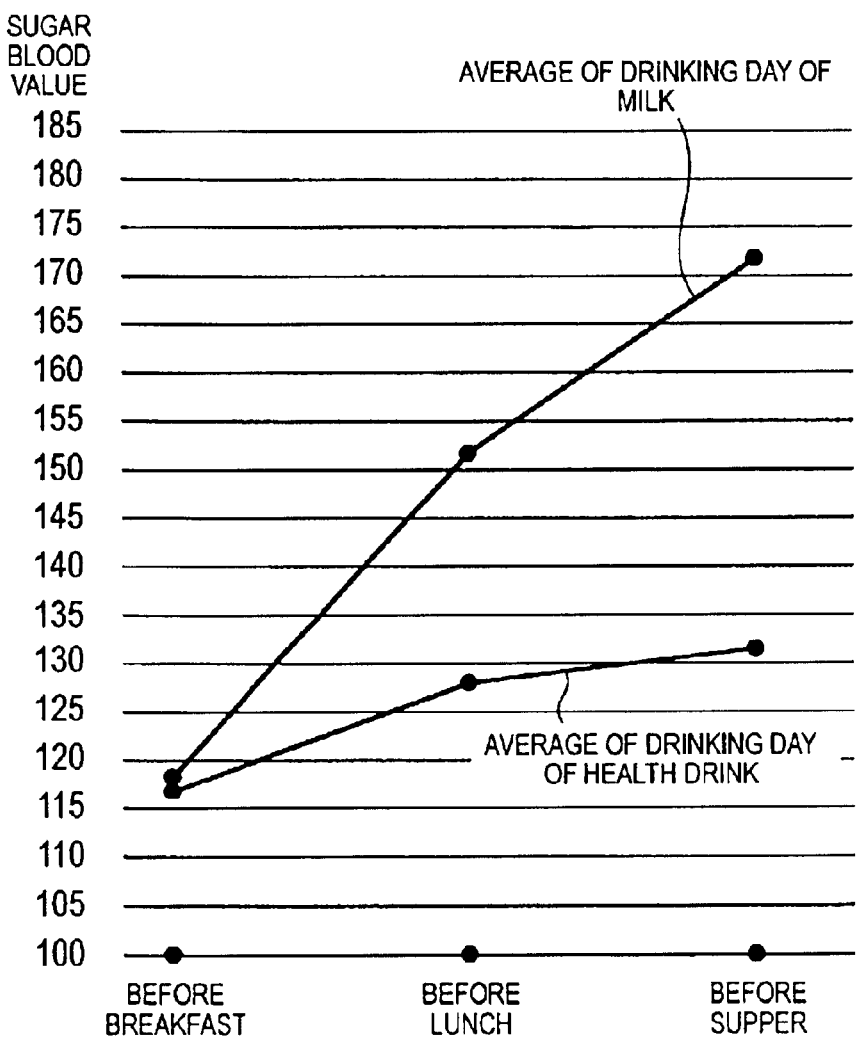
FIG. 2 is a graph showing the effect brought by the health drink of this invention in lowering the blood sugar level and FIG. 3 is a graph showing the effect brought by the health drink of this invention in lowering the blood sugar level.

When the health drink obtained in Example 3 was tried by five patients of diabetes, the test afforded the results shown in FIG. 2.

EXAMPLE 5

When a patient of diabetes (first kind diabetes) (IDDM) hospitalized for 9 days (given Basen and Daoneal) was measured for blood sugar level prior to breakfast, prior to lunch, and prior to supper, the results shown in Table 1 were obtained. While the same patient was continuously hospitalized for 11 days for therapy with insulin (by administration of 12+8 units of insulin), he was daily measured for blood sugar level prior to breakfast, prior to lunch, and prior to supper. The results were as shown in Table 2.

When the same measurement was continued for 22 days after the discharge from the hospital, then the same measurement was continued for 16 days, and the same measurement was continued for 15 days, the results were as shown in Table 2. The averages of these results were as shown in Table 2.

Then, for four months following the date of discharge, he was given 400 ml of the health drink obtained in Example 2 once daily and meanwhile tested for monthly sugar blood level. The monthly averages of the results of measurement were as shown in Table 2. The averages of the results obtained in the 4 months were as shown in Table 2.

Further, for 3 months, he was given a dose of 22 units of insulin every day and 400 ml of the aforementioned health drink once daily. The monthly averages of the results of test for blood sugar level were as shown in Table 2. The averages of the results obtained in the three months were as shown in Table 2.

The measurement was performed in the case of giving a daily dose of 20 units of insulin and omitting the use of the health drink and in the case of giving a daily dose of 20 units of insulin and giving 400 ml of the aforementioned health drink once every other day. The averages of the measurement were as shown in Table 3.

Figure 3:
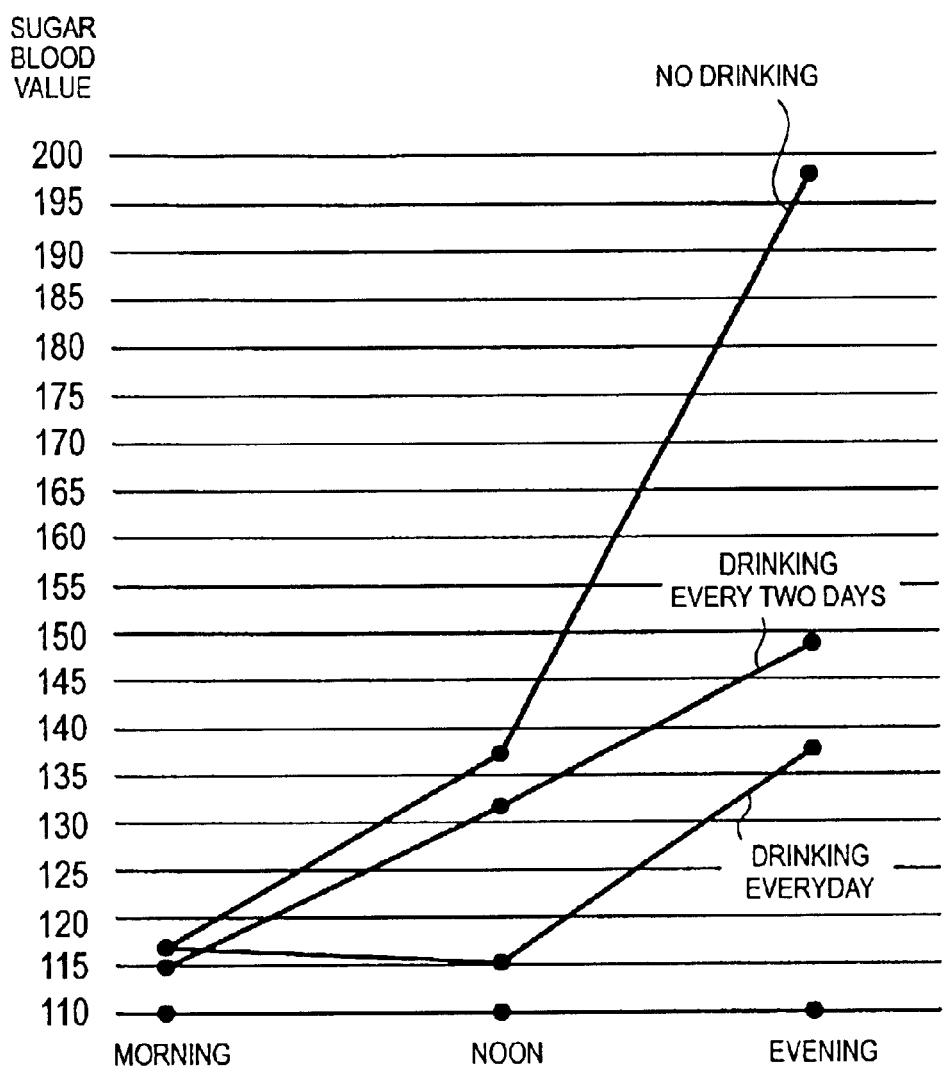

These results are graphically illustrated in FIG. 32. In the diagram of FIG. 3, the curve A represents the data, namely the average blood sugar level, obtained by giving 22 units of insulin and 400 ml of the aforementioned health drink daily, the curve B the data obtained by giving 20 units of insulin daily and 400 ml of the aforementioned health drink once every other day, and the curve C the data obtained by giving 20 units of insulin along once daily.

The entire disclosure of Japanese Patent Application No. 2001-208202 filed on Jul. 9, 2002, including specification, claims, drawings and summary are incorporated herein by reference in its entirety.

TABLE 2

|  | Prior to breakfast | Prior to lunch | Prior to supper |
|---|---|---|---|
| First 9 days (start of hospitalization) | 158 | 218 | 171 |
| Next 11 days (hospitalization for cure with insulin | 163 | 206 | 199 |
| Next 22 days (after discharge from the hospital) | 131 | 147 | 210 |
| Further 16 days (after discharge from the hospital) | 113 | 120 | 232 |
| Further 15 days (after discharge from the hospital) | 110 | 136 | 197 |
| Average | 118 | 136 | 197 |
| After start of use of health drink |  |  |  |
| First one month (after discharge from the hospital) | 96 | 113 | 131 |
| Next one month (after discharge from the hospital | 103 | 119 | 141 |
| Further one month (after discharge from the hospital) | 131 | 150 | 145 |
| Further one month (after discharge from the hospital) | 131 | 140 | 155 |
| Average | 115 | 131 | 145 |
| Administration of 22 units of insulin |  |  |  |
| First one month | 124 | 112 | 127 |
| Next one month | 121 | 112 | 153 |
| Further one month | 109 | 121 | 131 |
| Average | 118 | 115 | 137 |
| Administration of 20 units of insulation |  |  |  |
| Average in the month omitting use of health drink | 118 | 136 | 197 |
| Average in the month using health drink (once every other day) | 115 | 131 | 143 |

TABLE 2-continued

|  | Prior to breakfast | Prior to lunch | Prior to supper |
|---|---|---|---|
| Administration of 22 units of insulin | | | |
| Average in the month using health drink | 118 | 115 | 137 |

What is claimed is:

1. A health drink composed of
   A. 3–15% by mass of soymilk calculated as a solid content,
   B. 0.2–8% by mass of egg white calculated as a solid content,
   C. 0.1–5% by mass of a sweetener calculated as a solid content, and
   D. the balance of water
   (providing that A+B+C+D total 100% by mass).

2. A health drink according to claim 1, which is composed of
   A. 4–10% by mass of soymilk calculated as a solid content,
   B. 1–6% by mass of egg white calculated as a solid content,
   C. 0.3–3% by mass of a sweetener calculated as a solid content, and
   D. the balance of water
   (providing that A+B+C+D total 100% by mass).

3. A health drink according to claim 1, wherein the proportion of said egg white to one part by mass of the solid content of said soymilk is in the range of 0.4–0.7 part by mass.

4. A health drink according to claim 1, wherein the proportion of said egg white to one part by mass of the solid content of said soymilk is in the range of 0.55–0.65 part by mass.

5. A health drink according to claim 1, which is composed of
   A. about 7% by mass of soymilk calculated as a solid content,
   B. about 4% by mass of egg white calculated as a solid content,
   C. about 1% by mass of a sweetener calculated as a solid content, and
   D. the balance of water
   (providing that A+B+C+D total 100% by mass).

6. A method for the production of a health drink composed of (A) 3–15% by mass of soymilk calculated as a solid content, (B) 0.2–8% by mass of egg white calculated as a solid content, (C) 0.1–5% by mass of a sweetener calculated as a solid content, and (D) the balance of water (providing that A+B+C+D total 100% by mass), which method is characterized by stirring till mixture (A) 3–15% by mass of soymilk calculated as a solid content, (B) 0.2–8% by mass of egg white calculated as a solid content, and (C) 0.1–5% by mass of a sweetener calculated as a solid content and thereafter filtering the resultant mixture thereby removing the excess of egg white which has escaped solution.

7. A method according to claim 6, which comprises stirring till mixture water containing 4–10% by mass of soymilk calculated as a solid content together with 1–6% by mass of egg white calculated as a solid content and 0.3–3% by mass of a sweetener calculated as a solid content and then filtering the formed mixture thereby removing the portion of egg white which has escaped solution.

8. A method according to claim 6, wherein the proportion of said egg white to 1 part by mass of the solid content of said soymilk is in the range of 0.4–0.7 part by mass.

* * * * *